(12) United States Patent
Carriere Lluch (10) Patent No.: US 12,036,088 B2
(45) Date of Patent: Jul. 16, 2024

(54) ORTHODONTIC DEVICE

(71) Applicant: ORTHODONTIC RESEARCH AND DEVELOPMENT, S.L., Barcelona (ES)

(72) Inventor: Luis Carriere Lluch, Barcelona (ES)

(73) Assignee: ORTHODONTIC RESEARCH AND DEVELOPMENT, S.L., Barcelona (ES)

( * ) Notice: Subject to any disclaimer, the term of this patent is extended or adjusted under 35 U.S.C. 154(b) by 792 days.

(21) Appl. No.: 16/616,411

(22) PCT Filed: May 28, 2018

(86) PCT No.: PCT/EP2018/063918
§ 371 (c)(1),
(2) Date: Nov. 22, 2019

(87) PCT Pub. No.: WO2018/219858
PCT Pub. Date: Dec. 6, 2018

(65) Prior Publication Data
US 2020/0085539 A1 Mar. 19, 2020

(30) Foreign Application Priority Data
May 29, 2017 (EP) .................................. 17382306

(51) Int. Cl.
*A61C 7/22* (2006.01)
*A61C 7/36* (2006.01)
(52) U.S. Cl.
CPC . *A61C 7/22* (2013.01); *A61C 7/36* (2013.01)
(58) Field of Classification Search
CPC .... A61C 7/08; A61C 7/22; A61C 7/36; A61C 9/0006; A61F 5/56; A61F 5/566; A61F 2005/563; A63B 71/085; Y10S 602/902
(Continued)

(56) References Cited

U.S. PATENT DOCUMENTS 4,795,342 A * 1/1989 Jones ..................... A61C 7/36
433/22
2006/0174897 A1* 8/2006 Sarkisian ............... A61F 5/566
128/859
(Continued)

FOREIGN PATENT DOCUMENTS

CN 1902041 A 1/2007
CN 101511299 A 8/2009
(Continued)

OTHER PUBLICATIONS

Wang et al. (Effect of non-spherical bearing geometry on transient elastohydrodynamic lubrication in metal-on-metal hip joint implants; Nov. 16, 2006); (Year: 2006).*
(Continued)

*Primary Examiner* — Ophelia A Hawthorne
*Assistant Examiner* — Michael Milo
(74) *Attorney, Agent, or Firm* — SQUIRE PATTON BOGGS (US) LLP (57) ABSTRACT

An orthodontic device for the segmental distalization of a posterior jawbone area is disclosed. The orthodontic device comprises a mesial element having a mesial base surface for attachment to a premolar or a canine, a projection for coupling with a traction element, and an arm comprising an elongate transverse pin at a distal end of the arm, and a distal base having a distal base surface configured for attachment to a molar, and a receptacle for receiving the transverse pin. A first axis is defined as being substantially perpendicular to the distal base surface, and the transverse pin has a mesial surface and a distal surface, an interior shape of the receptacle is such that the rotation about the first axis is limited by the mesial and/or distal surface touching against an inside of the receptacle. The disclosure also relates to orthodontic kits.

20 Claims, 5 Drawing Sheets

(58) Field of Classification Search
USPC .................... 128/848, 861; 433/19, 46, 7
See application file for complete search history.

(56) References Cited

U.S. PATENT DOCUMENTS

| | | | | |
|---|---|---|---|---|
| 2006/0257812 | A1* | 11/2006 | Lluch | A61C 7/00 |
| | | | | 433/19 |
| 2011/0244414 | A1 | 10/2011 | Lluch | |
| 2012/0029651 | A1* | 2/2012 | Ashton | A61F 2/3609 |
| | | | | 623/22.21 |
| 2013/0066436 | A1* | 3/2013 | Desa | A61F 2/4241 |
| | | | | 29/592 |
| 2014/0335468 | A1* | 11/2014 | Dickerson | A61C 7/20 |
| | | | | 433/19 |
| 2015/0064651 | A1* | 3/2015 | Zhang | A61F 5/566 |
| | | | | 128/848 |
| 2018/0318048 | A1* | 11/2018 | Voudouris | A61C 7/12 |

FOREIGN PATENT DOCUMENTS

| | | | | |
|---|---|---|---|---|
| CN | 102458297 A | | 5/2012 | |
| EP | 1433435 A2 | | 6/2004 | |
| EP | 1649824 A1 | | 4/2006 | |
| WO | WO-03028575 A2 * | 4/2003 | ............ A61C 7/00 |
| WO | WO 2009/017944 A1 | 2/2009 | |
| WO | WO 2013/144283 A1 | 10/2013 | |
| WO | WO-2017070799 A1 * | 10/2015 | ............ A61C 7/12 |
| WO | WO 2017/070799 A1 | 5/2017 | |

OTHER PUBLICATIONS

Search Report dated Mar. 22, 2021 issued for Chinese Patent Application No. 201880031953.0, with English translation, 8 pages.
International Search Report mailed Jul. 13, 2018 for Application No. PCT/EP2018/063918, 3 pages.
Written Opinion of the International Searching Authority mailed Jul. 13, 2018 for Application No. PCT/EP2018/063918, 5 pages.

* cited by examiner

ORTHODONTIC DEVICE

PRIORITY

This application is a 35 U.S.C. 371 filing of International Application No. PCT/EP2018/063918, filed on May 28, 2018, which claims priority to and the benefit of European Patent Application EP 17382306.3 filed on May 29, 2017.

This application is a 35 U.S.C. 371 filing of International Application No. PCT/EP2018/063918, filed on May 28, 2018, which claims priority to and the benefit of European Patent Application EP 17382306.3 filed on May 29, 2017, all of which are incorporated verbatim herein by reference in their entirety, including the specifications, drawings, and the claims.

The present disclosure relates to an orthodontic device, and more particularly relates to an orthodontic device for segmental distalization of a posterior jawbone sector.

BACKGROUND ART

Depending on a patient's malocclusion, a variety of orthodontic treatments is available. In some of these treatments, extraction of teeth may be required in order to create space for the remaining teeth. In some treatments, a distalizing element may be used, possibly in combination with the extraction of one or more teeth.

A segment of teeth is herein defined as a group of neighbouring teeth, i.e. two or more neighbouring teeth. Distalization of the segment of teeth relates to moving a group of teeth together. In particular, in the present disclosure distalization refers moving a group of teeth in the distal direction of the mouth. The group of teeth may be located in the upper jawbone (maxilla) or in the lower jawbone (mandible).

A particular distalizing element is known from e.g. EP 1 433 435 and EP 1 649 824. These distalizers are especially adapted for the segmental distalization of the canine-to-molar posterior maxillary area. The distalizers of these documents comprise a mesial element which may be fixed by its base to an upper canine, and further comprises a distal element which may be fixed by its base to an upper molar, in particular the first molar.

The mesial element in these designs comprises both a base, and an arm that connects it to the distal element. The arm may be substantially arch shaped and may comprise a ball member at one of its ends. This ball member is received in a receptacle of the distal element that has a complementary shape to the ball member.

The mesial element may comprise a blunt projection that extends substantially forwards which may serve as a hooking element. In use, a bracket with a hook may be attached to a mandibular molar and an (orthodontic) rubber band may be suspended around this hook and the hooking element on the mesial element.

This way, a force pulling the maxillary canine backwards is provided. If the patient is wearing e.g. a splint (or another fixation device) that acts as a solid anchor and fixes the teeth of the mandible in position, it may be ensured that the teeth in the mandible do not move forwards, and that the maxillary canine is pulled backwards.

Due to the connection between the mesial element and the distal element of the distalizer, the maxillary molar may thus also be pushed backwards. At the same time, due to the shape of the arm in between the canine and the molar and due to the position of the distal element on the molar, a rotational force is also exerted upon the molar. This rotational force may result in a pivot about the palatal root of the maxillary molar. Also, a rotation in the distal direction of the molar ("uprighting") may result. Thus a backwards force and a rotational force may be exerted upon the molar at the same time.

In order to avoid that the maxillary molar rotates too much in the distal direction (i.e. in this case, it would assume an orientation in which it is tilted backwards), the shape of the receptacle and the ball member are such that with a predetermined rotation of the ball member with respect to the upper molar, the ball member touches the inside of the receptacle and cannot rotate further. To this end, both the mesial element and distal element are mounted at the right height on the molar and canine and are mounted substantially straight along the locally defined mandible-maxilla (straight up-down) direction on the surface of the tooth. The arm is provided at a predefined angle with respect to the ball member. When both the canine and molar are actually straight, this angle will make sure that the ball member or the arm of the mesial element touches the border of the receptacle and cannot rotate further.

Similarly, the shape of the ball member and the border of the receptacle may be such that a rotation of the upper molar around its palatal root is limited. Once a predetermined rotation is reached, the arm may touch the border of the receptacle and the ball member is not able to rotate further.

It may thus be ensured that a distalization of the canine-molar segment may be combined with a proper (re)orientation of the set of teeth in the maxillary posterior region.

One drawback related to these prior art distalization devices is that they cannot be mounted in the mandible of many patients, because there is not sufficient space available between molar in the mandible and an inside of a cheek of a patient. Also, when such a distalization device is mounted on a molar in the mandible, a molar in the maxilla could enter into collision with the distalization device. The height of the distalization device would need to be reduced for treatments in the mandible of some patients.

A further drawback related to these prior art distalization devices is that their ability to adapt for torsion along the arm of the mesial element is limited. Torsion along the arm may occur because e.g. a molar is inclined inwards (i.e. in the lingual direction) with respect to the canine/premolar to which the mesial element is attached. In these cases, it is not always possible to correctly position the distalization device.

US2011/0244414 provides a further distalization device which has a reduced height, as compared to the devices described in EP 1 433 435 and EP 1 649 824. The distalization device of US 2011/0244414 consists of a single element coupled to a canine/premolar and a molar. The coupling involving a ball member and receptacle is not present in this device. This allows a height reduction, and makes it possible to use the device in treatments of many patients in the mandible, but limits the functionality of the distalization device, as the rotation of the mesial element with respect to the distal element and corresponding collision points of the ball member or arm and the receptacle are eliminated. These devices therefore have a limited ability to adjust the position of a molar both in "uprighting" and in torsion.

There exists a need for a segmental distalization device that at least partially reduces some of the aforementioned drawbacks.

SUMMARY

According to a first aspect, an orthodontic device for the segmental distalization of a posterior jawbone area is provided. The orthodontic device comprises a mesial element having a mesial base surface configured for attachment to a premolar or a canine, a projection for coupling with a traction element, and an arm wherein the arm comprises an elongate transverse pin at a distal end of the arm. The orthodontic device further comprises a distal base having a distal base surface configured for attachment to a molar, and a receptacle for receiving the transverse pin. A first axis is defined as being substantially perpendicular to the distal base surface, and a second axis is defined as a mesial-distal direction substantially parallel to the distal base surface and substantially perpendicular to the first axis. According to the first aspect, the transverse pin has a mesial surface and a distal surface, wherein an interior shape of the receptacle is such that the transverse pin can be rotated about the first axis over an angle between 1° and 45°, and wherein the rotation about the first axis is limited by the mesial and/or distal surface touching against an inside of the receptacle.

According to the first aspect, the transverse pin can have a reduced height as compared to a ball member, and may thus be mounted also in the mandible of patients without bothering a patient, because contact with an inside of the cheek and the device or contact between a molar in the maxilla and the device can be avoided.

The transverse pin having a mesial surface and a distal surface entering into contact with an inside of the receptacle to limit the rotation around the first axis provides the functionality of limiting uprighting of the molar.

In some examples, the transverse pin can be rotated about the first axis over an angle between 5° and 20°, and specifically between 8° and 12°.

In some examples, the transverse pin may be substantially cylindrical. In further examples, cross-sectional dimensions of the transverse pin may reduce gradually from a central point of attachment to the arm towards both extremes of the pin. An aspect of the gradual reduction is that a smoothly increasing contact between the distal and mesial surfaces of the transverse pin and the inside of the receptacle is provide as the transverse pin rotates about the first axis.

In some examples, a height of the transverse pin along the first axis may be less than a length of the transverse pin along a longitudinal axis of the transverse pin, specifically less than ¾ of the length and more specifically less than ½ of a length of the transverse pin.

In some examples, the transverse pin may have a longitudinal axis and the receptacle may be such that the transverse pin can be rotated about the longitudinal axis over an angle between 0° and 60°, specifically between 15° and 45°. The degree of rotation allowed along the longitudinal axis may be limited by the arm colliding against a border of the receptacle. The degree of rotation allowed determines the rotation of the molar about its palatal root. Rotation around the first and the second axis, in combination with the reduced height of the device enables treatment of patients with differing dental scenarios, and different malocclusions.

In some examples, the transverse pin has an upper surface and a lower surface, and wherein the interior shape of the receptacle may be such that the transverse pin can be rotated about the second axis and over an angle between 1° and 30°, specifically between 5° and 15°, and wherein the rotation about the second axis is limited by the upper and/or lower surface touching against an inside of the receptacle. In these examples, moments and forces provoked by torsional forces along the arm of the orthodontic device may be well absorbed by the receptacle.

In some examples, a centre plane is defined by the first axis and the second axis (at the height of the arm of the mesial element), and wherein the transverse pin is asymmetrical with respect to the centre plane. In some examples, a centre plane is defined by the first axis and the second axis, and the receptacle may be asymmetrical with respect to the centre plane. Asymmetries may be introduced in the device to allow for more rotation in one direction than another. Asymmetries may be present in the transverse pin and/or in the inside of the receptacle.

In some examples, a third axis is arranged perpendicular to the first and to the second axis, and an angle between the third axis and the longitudinal axis of the transverse pin may be between 0° and 15°.

In a further aspect, a kit comprising an orthodontic device according to any of the herein disclosed examples and one or more rubber bands is provided. The rubber bands are an example of a traction device. Alternative traction devices involving pistons, pins, or other elements may be used as long as a distal force can be provided to the distalization device. Optionally, the kit may further comprise a distal anchor for coupling with the rubber band. In some examples, the anchor may be a bracket. In other examples, TAD's (Temporary Anchorage Devices) may be used.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1A:
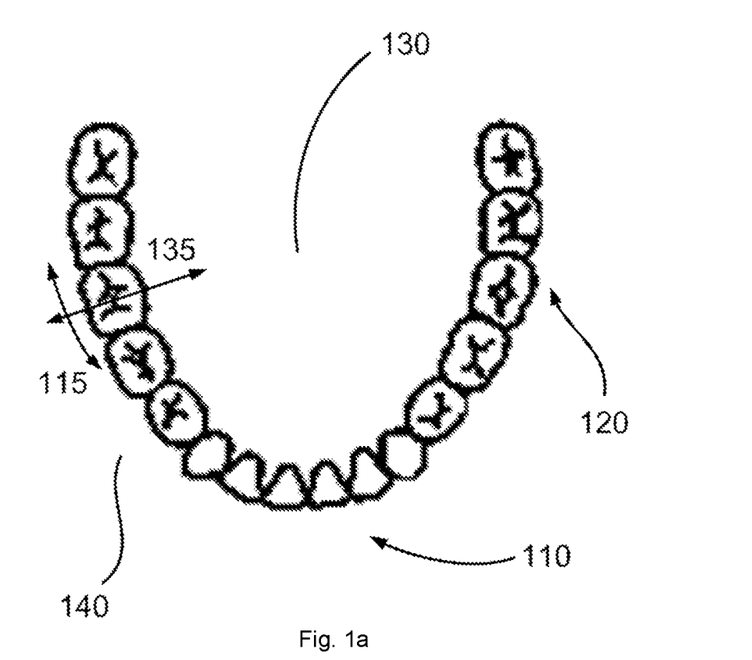
FIGS. 1a-1b illustrates some of the terminology used herein.

FIG. 1a schematically illustrates the arrangement of teeth in the lower jaw (mandible). A front portion of the mouth 110 may be referred to as a mesial region. A rear portion of the mouth 120 may be referred to as a distal region. An inner portion of the mouth behind the teeth 130 may be referred to as a lingual region. An outer portion of the mouth 140 may be referred to as a labial region. A mesial-distal direction 115 with respect to a specific tooth (first molar) has been schematically indicated in FIG. 1. Also indicated in FIG. 1 is a lingual-labial direction 135 with respect to the same tooth. This terminology will be adhered to in the present disclosure.

Figure 1B:
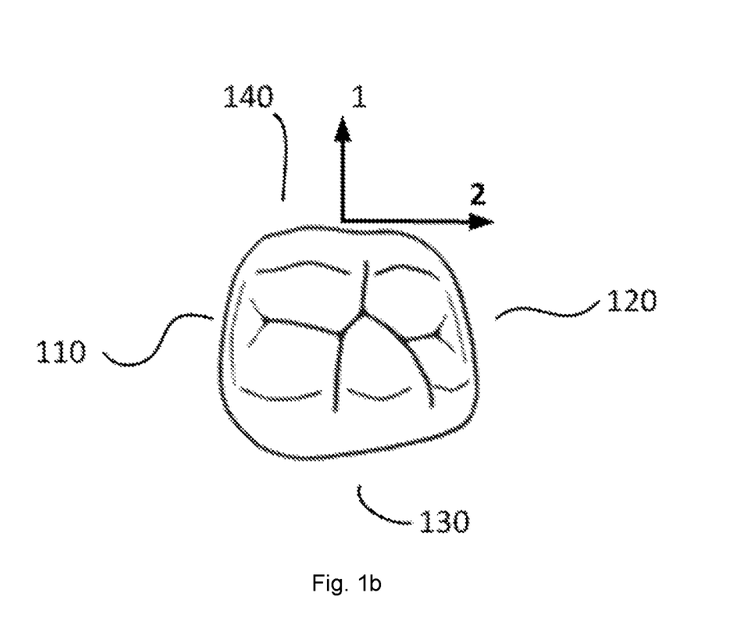

FIG. 1b schematically illustrates a molar. A mesial side of the molar is indicated by reference sign 110, whereas a distal side of the molar is indicated with reference sign 120. Reference signs 130 and 140 respectively indicate the lingual and labial sides of the molar.

In the present disclose, a first axis is defined as an axis substantially perpendicular to a base surface of a distal element attached to a lingual surface of the molar. In FIG. 1b, the first axis is indicated with reference sign 1. A second axis may be defined as extending along the mesial-distal direction substantially parallel to the base surface of the distal element. The second axis 2 is perpendicular to the first axis 1.

Figure 1C:
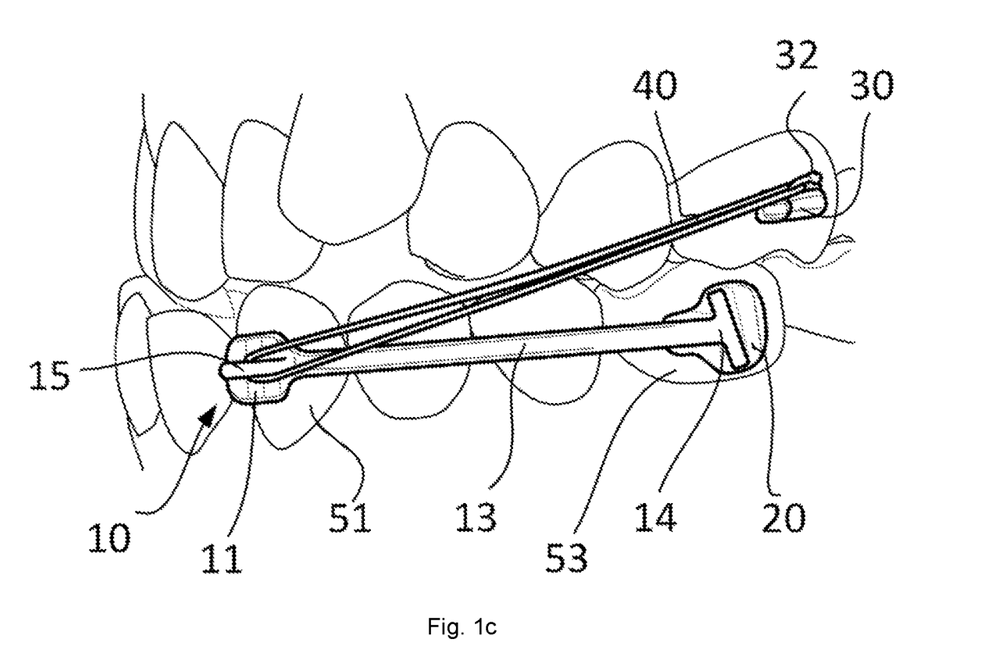
FIG. 1c illustrates an example of an orthodontic device attached to a canine and a molar in a maxilla of a patient.

FIG. 1c schematically illustrates an implementation of an orthodontic device used for segmental distalization. An orthodontic device comprises a mesial element 10 and a distal element 20. The mesial element 10 has a base 11 which may be configured to be attached to a canine, in this particular example a mandibular canine 51. The distal element 20 may be configured to be attached to a molar, e.g. a mandibular molar 53.

The mesial element 10 comprises an arm 13 ending in a transverse pin 14 which is located in a receptacle of distal element 20. More details relating to pin 14 and the receptacle in the distal element 20 will be explained with reference to the other drawings.

A mesial element 10 comprises a projection 15 around which a rubber band 40 may be arranged. The rubber band 40 may also be arranged around a projection or hook 32 on an anchor 30, thereby exerting force on the mesial element 15. The anchor 30 may be mounted e.g. to a maxillar molar. In some examples, the anchor could be a bracket.

This way, a force pulling the maxillary canine backwards is provided. If the patient is wearing e.g. a splint (or another fixation device) that acts as a solid anchor and fixes the teeth of the mandible in position, it may be ensured that the teeth in the mandible do not move forwards, and that the maxillary canine is pulled backwards.

Due to the connection between the mesial element 10 and the distal element 20 of the distalizer, the maxillary molar 53 may thus also be pushed backwards. At the same time, due to the shape of the arm in between the canine and the molar and due to the position of the distal element on the molar, a rotational force is also exerted upon the molar 53. This rotational force may result in a pivot about the palatal root of the maxillary molar. Also, a rotation in the distal direction of the molar ("uprighting") may result. Thus a backwards force and a rotational force may be exerted upon the molar at the same time.

In alternative configurations, a traction element other than a rubber band might be used. In alternative configurations, a different anchor may be used, e.g. a TAD positioned in the palate. In some examples, an anchor may include a threaded hole, and the traction element may be a pin with a mating thread. By threading the pin in the threaded hole, traction can be applied.

Figure 2A:
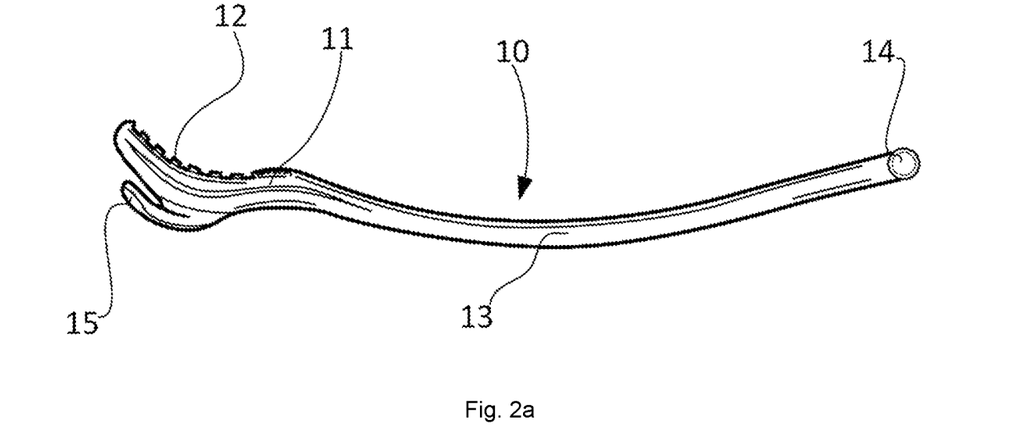
FIGS. 2a-2b illustrate an example of a mesial and distal element of an orthodontic device according to an implementation.

FIG. 2a illustrates a mesial element of an example of an orthodontic device. The mesial element 10 comprises an arm which in use is arranged along a mesial-distal direction. At a distal end of the arm 13 a transverse pin 14 is arranged. The mesial element has a mesial base 11 having a mesial base surface 12 which is configured for being attached to a canine or premolar. The mesial base surface 12 may include a number of protrusions for attachment to a canine. This base surface may be slightly concave to adapt to the specific tooth it needs to be attached to.

Before attachment, the surface of the tooth may be cleaned, possibly etched and subsequently dried. Then, an adhesive may be applied to the surface of the tooth. It is known to use an adhesive which may be activated using light. The orthodontic appliance, possibly also comprising an adhesive on its base surface may then be attached to the surface of the tooth. After activation of the adhesive using e.g. light, the orthodontic appliance may be firmly fixed to the tooth. Different types of adhesives may be used, such as e.g. composite resins or glass ionomer cement. This process is also referred to as "bonding", or, depending on the adhesive used "cement bonding".

Figure 2B:
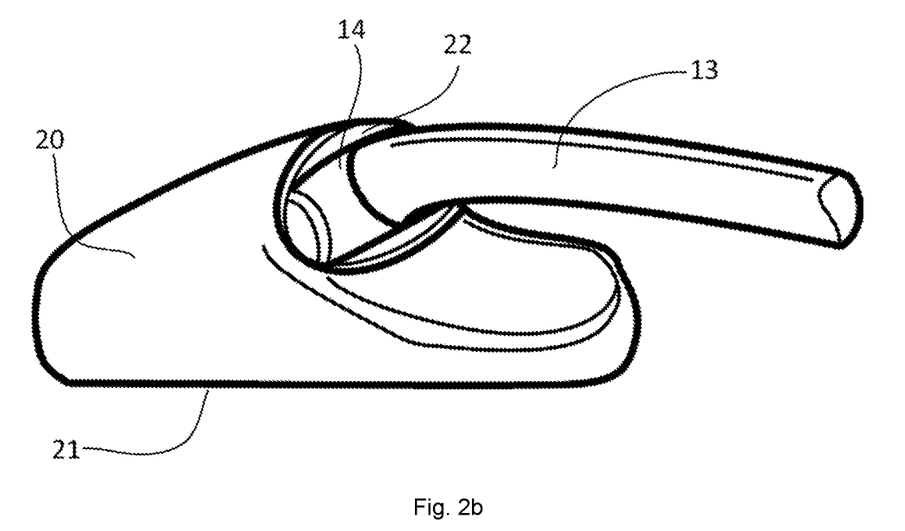

FIG. 2b illustrates a distal element 20 having a distal base surface 21 adapted to be fixed to a molar surface. As the mesial base surface illustrated in FIG. 2a, the distal base surface may comprise protrusions that aide in bonding to the molar.

A distal end of arm 13 comprises a transverse pin arranged in receptacle 22. The transverse pin 14 is configured to rotate about a longitudinal axis of the pin 14.

In a process for assembly of the distalization device, the receptacle may originally be slightly enlarged with respect to the pin 14 so that the pin can be introduced without deforming the pin. After introduction of the pin, the opening of the receptacle may be reduced, involving e.g. local deformation or deformation of the complete border. In particular, local deformation involving coining is a preferred example. To be clear, such an assembly process takes place in an industrial setting before packing and shipping the product. The assembly is not done by an orthodontist.

Figure 3A:
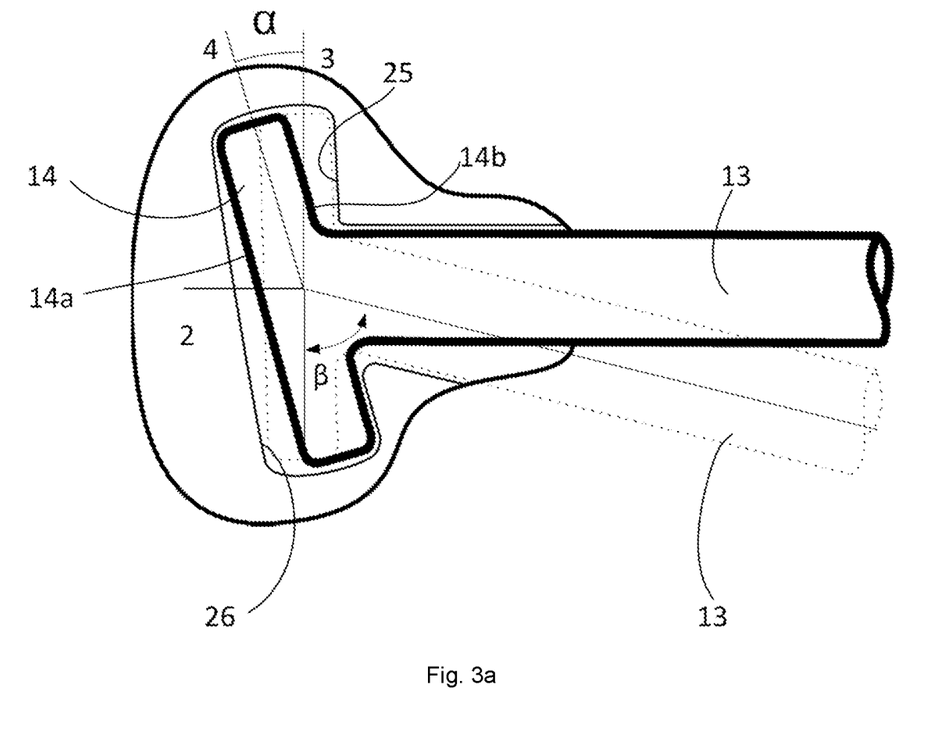
FIGS. 3a-3b show cross-sectional top views of a transverse pin in a receptacle of the distal element according to different examples.

FIG. 3a shows a cross-sectional top view of a transverse pin in a receptacle of the distal element according to an example. A longitudinal axis of the transverse pin is indicated with reference sign 4. The third axis indicated with reference sign 3 may be defined as perpendicular to the first axis and to the second axis defined in FIG. 1b. I.e. the third axis may in use be arranged substantially vertically. An angle between the longitudinal axis 4 of the transverse pin 14 and the third axis 3 may be between 0° and 20°. The angle may vary during a treatment, as a molar rotates as it is pushed backwards by arm 13. The rotation of the molar results in a rotation around the first axis, perpendicular to the second axis and third axis 3.

The limitation of the rotation around the first axis is limited by a mesial surface 14b touching against a mesial wall 25 of an inside of the receptacle. The limitation of the rotation around the first axis may also be limited by a distal surface 14a touching against a distal wall 26 of the receptacle.

A second orientation of the same mesial element including arm 13 and pin 14 is shown in an interrupted line.

The acute angle β between the longitudinal axis of the transverse pin and the longitudinal axis of the arm may be between 70° and 90°.

Figure 3B:
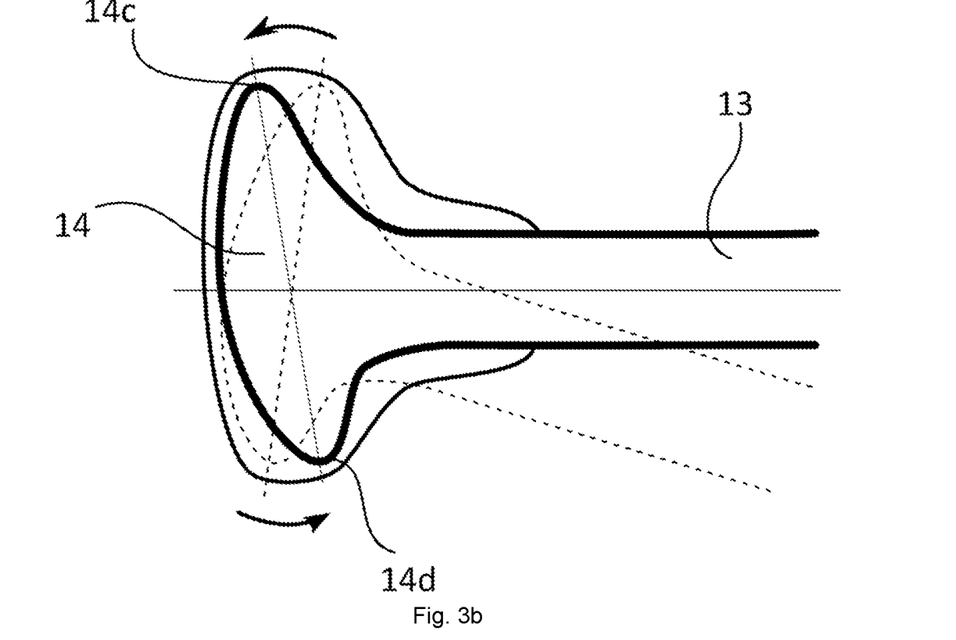

FIG. 3b shows a cross-sectional top view of a transverse pin in a receptacle of the distal element according to a further example. In the example illustrated in FIG. 3b, the transverse pin has a varying cross-section along the longitudinal axis. From a central point where a transverse pin 14 is connected to arm, the cross-sectional dimension decrease in both directions to ends 14c and 14d.

The effect if this decrease is that the increase in contact between pin and receptacle (and thus resistance to further rotation) is more gradual.

Figure 4A:
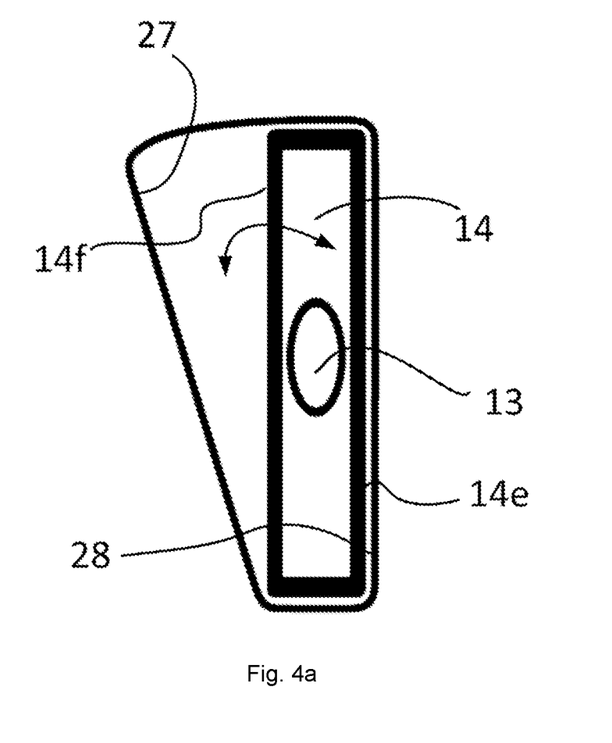
FIGS. 4a and 4b show cross-sectional side views of a transverse pin in a receptacle of the distal element according to different examples.
Figure 4B:
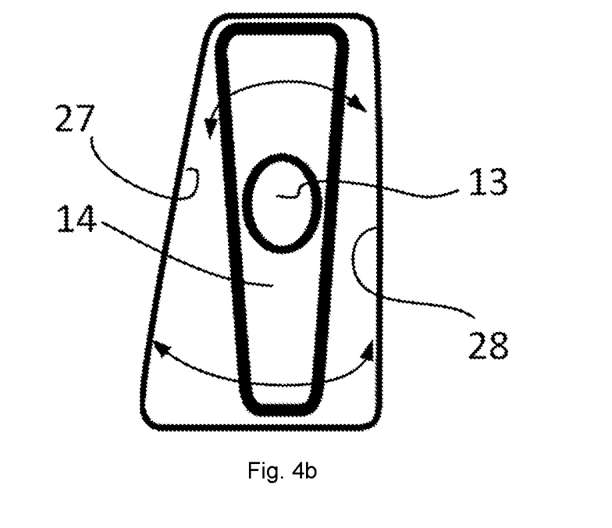

FIGS. 4a and 4b show cross-sectional side views of a transverse pin in a receptacle of the distal element according to different examples. In the example of FIG. 4a, the transverse pin is of constant cross-section and is symmetrical with respect to arm 13. The receptacle however is shaped asymmetrically. The transverse pin is allowed to rotate about the axis of arm 13 in one direction only. The limits of rotation are determined by contact points of upper surface 14f of the transverse pin and inner upper surface 27 of the receptacle, and by lower surface 14e of the transverse pin, and inner lower surface 28 of the receptacle.

In the example of FIG. 4b, both the transverse pin, and the receptacle are asymmetrical with respect to the arm 13. Asymmetries may be used to allow more rotation in one direction than in another.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. An orthodontic device for the segmental distalization of a posterior jawbone area comprising:
    a mesial element having a mesial base surface configured for attachment to a premolar or a canine, a projection for coupling with a traction element, and an arm,
    wherein the arm comprises an elongate transverse pin at a distal end of the arm, and the elongate transverse pin has a mesial surface and a distal surface;
    a distal base having a distal base surface configured for attachment to a molar, and a receptacle for receiving the elongate transverse pin;
    wherein a first axis is defined as being perpendicular to the distal base surface, and
    wherein an inside of the receptacle is configured to permit the elongate transverse pin to rotate about the first axis over an angle between 1° and 45°, and wherein the rotation about the first axis is limited by the mesial surface and/or the distal surface touching against the inside of the receptacle and the rotation about the first axis is not limited by any portion of the arm other than the elongate transverse pin.

2. A kit comprising the orthodontic device according to claim 1 and one or more rubber bands.

3. The kit according to claim 2 and further comprising an anchor for coupling with the one or more rubber bands.

4. The kit according to claim 3, wherein the anchor is a bracket.

5. The orthodontic device according to claim 1, wherein the inside of the receptacle is configured to permit the elongate transverse pin to rotate about the first axis between 5° and 20°.

6. The orthodontic device according to claim 5, wherein the receptacle is configured to permit the elongate transverse pin to rotate about the first axis between 8° and 15°.

7. The orthodontic device according to claim 1, wherein the elongate transverse pin has a longitudinal axis and the receptacle is configured to permit the elongate transverse pin to rotate about the longitudinal axis over an angle between 0° and 60°.

8. The orthodontic device according to claim 7, wherein the receptacle is configured to permit the elongate transverse pin to rotate about the longitudinal axis over an angle between 15° and 45°.

9. The orthodontic device according to claim 1, wherein the elongate transverse pin is cylindrical.

10. The orthodontic device according to claim 1, wherein the elongate transverse pin has varying cross-sectional dimensions from a first end of the elongate transverse pin to a second end of the elongate transverse pin, and wherein the cross-sectional dimensions decrease from a central point of attachment of the elongate transverse pin to the arm towards the first and the second end of the elongate transverse pin.

11. The orthodontic device according to claim 1, wherein a height of the elongate transverse pin measured along the first axis is less than ¾ of a length of the elongate transverse pin measured along a longitudinal axis of the elongate transverse pin.

12. The orthodontic device according to claim 1, wherein a second axis is defined as a mesial-distal direction parallel to the distal base surface and being perpendicular to the first axis, wherein the elongate transverse pin has an upper surface and a lower surface, and wherein the inside of the receptacle is configured to permit the elongate transverse pin to rotate about the second axis over an angle between 1° and 30°, and wherein the rotation about the second axis is limited by the upper surface and/or the lower surface touching against the inside of the receptacle.

13. The orthodontic device according to claim 1, wherein a centre plane is defined by the first axis and the second axis, and wherein the elongate transverse pin is asymmetrical with respect to the centre plane.

14. The orthodontic device according to claim 1, wherein a centre plane is defined by the first axis and the second axis, and wherein the receptacle is asymmetrical with respect to the centre plane.

15. The orthodontic device according to claim 1, wherein the projection of the mesial element is a hook.

16. The orthodontic device according to claim 1, wherein an angle between a longitudinal axis of the elongate transverse pin and a longitudinal axis of the arm is between 70° and 90°.

17. An orthodontic device for the segmental distalization of a posterior jawbone area comprising:
    a mesial element configured for attachment to a premolar or a canine, including a hook for coupling with a traction element, and an arm comprising an elongate transverse pin formed at a distal end of the arm;
    a distal base configured for attachment to a molar, and a receptacle for receiving the elongate transverse pin;
    wherein a first axis is defined as being perpendicular to a distal base surface, and wherein an inside of the receptacle is configured to permit the elongate transverse pin to rotate about the first axis over an angle between 1° and 45°, and wherein the rotation about the first axis is limited by the elongate transverse pin touching against an inside of the receptacle and the rotation about the first axis is not limited by any portion of the arm other than the elongate transverse pin.

18. The orthodontic device according to claim 17, wherein the elongate transverse pin is cylindrical.

19. The orthodontic device according to claim 18, wherein the elongate transverse pin has a longitudinal axis and the receptacle is configured to permit the elongate transverse pin to rotate about the longitudinal axis over an angle between 0° and 60°.

20. The orthodontic device according to claim 17, wherein a second axis is defined as a mesial-distal direction that is parallel to the distal base surface and is perpendicular to the first axis, and wherein
    the inside of the receptacle is configured to permit the elongate transverse pin to rotate about the second axis and over an angle between 1° and 30°.

* * * * *